United States Patent
Ming

(10) Patent No.: US 11,108,048 B2
(45) Date of Patent: Aug. 31, 2021

(54) ANODE BINDER COMPOSITION FOR LITHIUM ION BATTERY PERFORMANCE

(71) Applicant: FORD GLOBAL TECHNOLOGIES, LLC, Dearborn, MI (US)

(72) Inventor: Yang Ming, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 147 days.

(21) Appl. No.: 16/527,642

(22) Filed: Jul. 31, 2019

(65) Prior Publication Data
US 2021/0036325 A1 Feb. 4, 2021

(51) Int. Cl.
*H01M 4/62* (2006.01)
*H01M 10/0525* (2010.01)
*H01M 4/02* (2006.01)

(52) U.S. Cl.
CPC .......... *H01M 4/622* (2013.01); *H01M 4/625* (2013.01); *H01M 10/0525* (2013.01); *H01M 2004/027* (2013.01)

(58) Field of Classification Search
CPC ....... H01M 10/0525; H01M 2004/027; H01M 4/622; H01M 4/625
See application file for complete search history.

(56) References Cited

U.S. PATENT DOCUMENTS

2015/0303479 A1 10/2015 Min
2017/0207441 A1 7/2017 Shen et al.

FOREIGN PATENT DOCUMENTS

CN 102237527 B 12/2014
CN 109103441 A * 12/2018 ........ H01M 10/0525

OTHER PUBLICATIONS

Machine Translation C109103441A (Year: 2018).*
Kovalenko et al., "A Major Constituent of Brown Algae for Use in High-Capacity Li-Ion Batteries," Science, Oct. 7. 2011, pp. 75-79, vol. 334—Issue 6052, New York, New York (6 pages).

* cited by examiner

*Primary Examiner* — Victoria H Lynch
(74) *Attorney, Agent, or Firm* — David B. Kelley; Brooks Kushman P.C.

(57) ABSTRACT

According to an embodiment, a lithium ion battery includes an anode having an active material, a conductive additive, and a binder including carboxymethyl cellulose, styrene-butadiene rubber, and magnesium-alginate at a ratio of 1.5:1.5:1 such that the specific capacity of the anode is 350 mAh/g to 365 mAh/g and an internal resistance of the anode is 65 mΩ to 75 mΩ. The lithium ion battery further includes a cathode, and a separator between the anode and cathode.

19 Claims, 2 Drawing Sheets

ANODE BINDER COMPOSITION FOR LITHIUM ION BATTERY PERFORMANCE

TECHNICAL FIELD

The present disclosure relates to lithium ion batteries, and more particularly anode binders for lithium ion batteries.

BACKGROUND

As the development of automobiles trends from hybrid electric vehicles (HEVs) towards battery electric vehicles (BEVs), the battery loading and capacities are important to performance. Furthermore, in conventional lithium ion batteries, the anode material loading inside a battery may require an increase from 8 mg/cm$^2$ to over 13 mg/cm$^2$. In conventional lithium ion batteries with anodes having higher loading, the electrochemical performance may be affected by the binder. The binder acts to tightly combine the anode active material (such as graphite) with the current collector (e.g., copper foil).

Conventional lithium ion batteries with graphite anodes include a binder mixture for improving performance of the anode. The conventional binder for graphite anodes is a mixture of carboxymethyl cellulose (CMC) and styrene-butadiene rubber (SBR). As development of BEVs continues, binder mixtures may improve battery performance and graphite anode stability in lithium ion batteries.

SUMMARY

According to an embodiment, a lithium ion battery includes an anode having an active material, a conductive additive, and a binder including carboxymethyl cellulose, styrene-butadiene rubber, and magnesium-alginate at a ratio of 1.5:1.5:1 such that a specific capacity of the anode is 350 mAh/g to 365 mAh/g and an internal resistance of the anode is 65 mΩ to 75 mΩ. The lithium ion battery further includes a cathode, and a separator between the anode and cathode.

According to one or more embodiments, the conductive additive may be graphite. In at least one embodiment, the anode may include 92.5-97.5% active material. In certain embodiments, the anode may comprise 95.5% active material, 1.5% carboxymethyl cellulose, 1.5% styrene-butadiene rubber, 1% magnesium-alginate, and 0.5% graphite. In one or more embodiments, the specific capacity may be 355 mAh/g to 360 mAh/g. In some embodiments, the anode may have a specific capacity of 357.5 mAh/g. In certain embodiments, the internal resistance may be 67.5 mΩ to 72.5 mΩ. Further, in some embodiments, the internal resistance may be 71.6 mΩ.

According to an embodiment, a lithium ion battery includes a cathode; an anode having an active material, a conductive additive, and a binder including carboxymethyl cellulose, styrene-butadiene rubber, and magnesium-alginate at a ratio of 1.5:1.5:1 such that a specific capacity of the anode is 350 mAh/g to 365 mAh/g; and a separator therebetween.

According to one or more embodiments, the conductive additive may be graphite. In one or more embodiments, the specific capacity may be 355 mAh/g to 360 mAh/g. In some embodiments, the anode may have a specific capacity of 357.5 mAh/g. In one or more embodiments, the anode may have an internal resistance of 65 mΩ to 75 mΩ. In at least one embodiment, the internal resistance may be 67.5 mΩ to 72.5 mΩ. Further, in some embodiments, the internal resistance may be 71.6 mΩ. In at least one embodiment, the anode may include 92.5% to 97.5% active material. In certain embodiments, the anode may comprise 95.5% active material, 1.5% carboxymethyl cellulose, 1.5% styrene-butadiene rubber, 1% magnesium-alginate, and 0.5% graphite.

According to an embodiment, a lithium ion battery comprises an anode including 95.5% active material, 1.5% carboxymethyl cellulose, 1.5% styrene-butadiene rubber, 1% magnesium-alginate, and 0.5% graphite; a cathode; and a separator therebetween.

According to one or more embodiments, the anode may have a specific capacity of 350 mAh/g to 365 mAh/g. In at least one embodiment, the anode may have an internal resistance of 65 mΩ to 75 mΩ.

DETAILED DESCRIPTION

Figure 1:
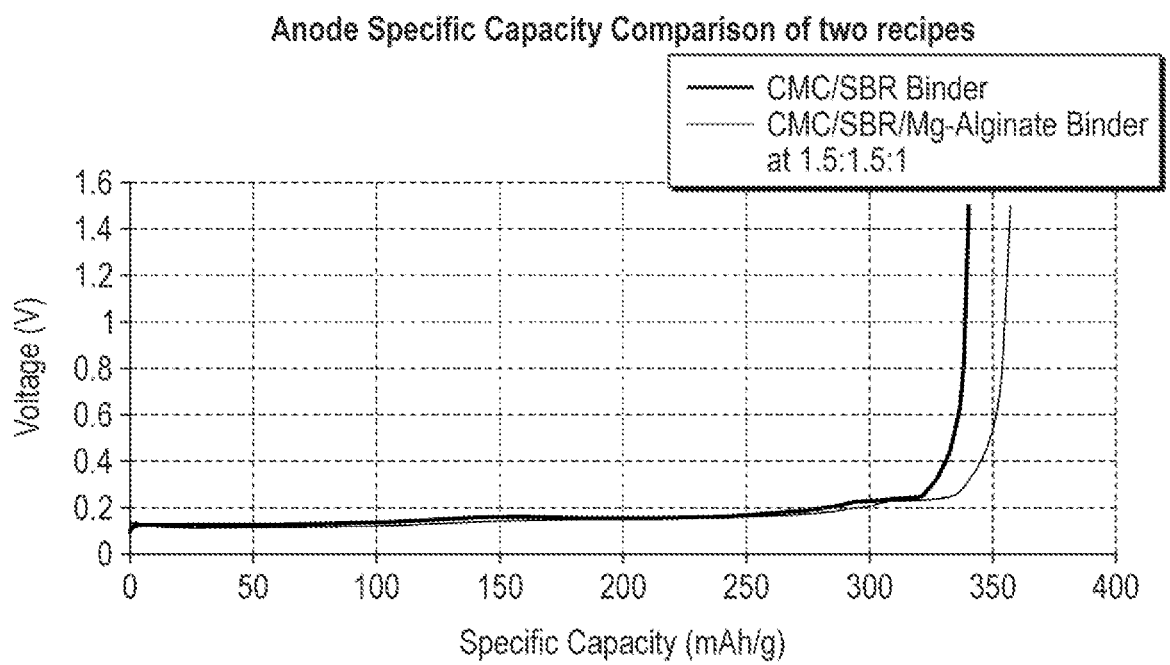
FIG. 1 is a graph comparing the anode specific capacity of a cell having a conventional CMC/SBR binder, and the anode specific capacity of a cell having a CMC/SBR/Mg-Alginate binder according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits stated is generally preferred. "About" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Also, unless expressly stated to the contrary, the description of a group or class of materials by suitable or preferred for a given purpose in connection with the disclosure implies that mixtures of any two or more members of the group or class may be equally suitable or preferred. Furthermore, unless expressly stated to the contrary, all ratios and percentages are measured by weight.

According to one or more embodiments, a lithium ion battery cell includes an anode, a cathode, a separator between the anode and cathode, and electrolyte. Each of the anode and cathode includes a respective current collector (e.g., copper for the anode and aluminum for the cathode). The anode includes active material, a conductive additive, and a binder. The cathode includes active material and an electrolyte, and may further include a conductive additive. The conductive additive in the cathode and/or anode may be a carbon additive, such as, but not limited to, graphite. The electrolyte in the lithium ion battery may be any suitable electrolyte, including but not limited to a liquid electrolyte, polymer electrolyte, or polymer gel electrolyte. In an embodiment, the liquid electrolyte may include a lithium salt and an organic solvent. Examples of lithium salts may include, but are not limited to, $LiPF_6$, $LiBF_4$, $LiClO_4$, or mixtures thereof. Suitable organic solvents may include, but is not limited to, ethylene carbonate (EC), dimethyl carbonate (DMC), ethyl methyl carbonate (EMC), diethyl carbonate (DEC), or mixtures thereof. However, any suitable lithium salt and organic solvent combination may be used.

According to one or more embodiments, the lithium ion battery includes an anode with a binder mixture including magnesium-alginate (Mg-Alginate). Alginate is an abundant high-modulus polysaccharide derived from brown seaweed. The binder mixture is a 1.5:1.5:1 ratio by weight of CMC/SBR/Mg-Alginate. In certain embodiments, the composition of the anode is 92.5-97.5% active material. In some embodiments, the anode composition includes 0.5% to 1.5% graphite. In certain embodiments, the anode composition includes 0.5% to 2.5% CMC and SBR, and 0.33% to 1.667% Mg-Alginate. In yet another embodiment, the anode composition is 95.5% active material. For example, in an embodiment with 95.5% active material, the anode composition includes 1.5% CMC, 1.5% SBR, 1% Mg-Alginate, and 0.5% graphite. In another example, in an embodiment where the anode is 97.5% active material, the anode composition further includes 0.75% CMC, 0.75% SBR, 0.5% Mg-Alginate, and 0.5% graphite. In yet another example, in an embodiment where the anode is 92.5% active material, the anode composition further includes 2.25% CMC, 2.25% SBR, 2.25% Mg-Alginate, and 1.5% graphite.

The chemistry of the Mg-Alginate includes more carboxylic groups in each of the polymer's monomeric units. The higher content of carboxylic group in the Mg-alginate when compared to other alginate salts improves the number of hydrogen bonds between the binder and the graphite in the anode (i.e., the anode active material and conductive additive). The higher content of carboxylic groups result in the active material and conductive additive being closely bonded, thus making it is easier for lithium ions to transfer between the active material/conductive additive, as well as with the current collector. The ease of lithium ion transfer contributes to improved conductivity and lower internal resistance. Low internal resistance is beneficial during fast charging, because it leads to a smaller polarization as well as less internal heat generation. Furthermore, with additional hydrogen bonds, the anode structure is more robust such that the active material is less likely to be disconnected from the conductive additive after cycle testing, leading to better cycle life for the battery. Thus, because the higher content of carboxylic group in the binder helps improve the number of binder-carbon bonds between the binder and the graphite, the anode stability and conductivity can be increased due to the additional bonds formed. Moreover, including Mg-Alginate in the anode at the ratio of 1.5:1.5:1 CMC/SBR/Mg-Alginate unexpectedly improves the anode performance of the lithium ion battery by increasing the specific capacity of the anode, as well as lowering internal cell resistance.

By including the CMC/SBR/Mg-Alginate binder at a 1.5:1.5:1 ratio, the cell performance is unexpectedly improved in various ways when compared with conventional CMC/SBR binders. For instance, the specific capacity of the anode is improved. By increasing specific capacity of the anode, the energy density of the battery can be improved, and lithium plating may be less likely. In certain embodiments, the specific capacity of the anode including the CMC/SBR/Mg-Alginate binder is 350 mAh/g to 365 mAh/g. In yet other embodiments, the specific capacity is 355 mAh/g to 360 mAh/g. In another embodiment, the specific capacity of the anode with the CMC/SBR/Mg-Alginate binder is 357.5 mAh/g. Additionally, reducing the internal resistance of the cell can improve battery performance. The internal resistance of the battery with the CMC/SBR/Mg-Alginate binder is, according to one or more embodiments, 65 to 75 mΩ, in other embodiments 67.5 to 72.5 mΩ, and in yet another embodiment 71.6 mΩ.

Referring to the Figures, the battery performance characteristics of cells including the 1.5:1.5:1 CMC/SBR/Mg-Alginate anode binder was compared to a cell including a conventional CMC/SBR binder to show the unexpected improvement in cell performance. Referring to FIG. 1, the specific capacity of a conventional graphite anode is shown based on half-cell test data, as compared to a graphite anode with the CMC/SBR/Mg-Alginate binder according to an embodiment. By including the CMC/SBR/Mg-Alginate binder in this embodiment, the anode specific capacity increases 5.1% from 340.2 mAh/g to 357.5 mAh/g.

Figure 2:
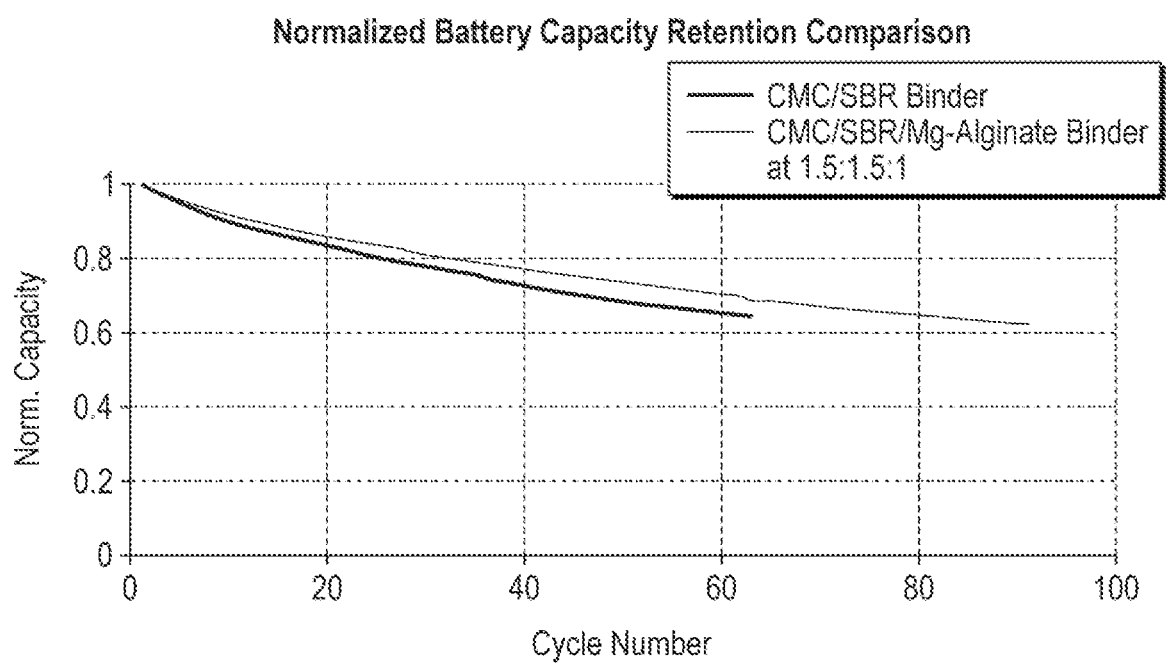
FIG. 2 is a normalized graph comparing the capacity retention of a cell having a conventional CMC/SBR binder, and the capacity retention of a cell having a CMC/SBR/Mg-Alginate binder according to an embodiment.

Furthermore, including the Mg-Alginate in the anode binder mixture can improve battery capacity retention over time, thus overcoming battery degradation obstacles of conventional binder mixtures. Referring to FIG. 2, the normalized capacity retention vs. cycle number plot is shown for 2 types of cells. The full cells were both made using the same Nickel-Cobalt-Manganese 1:1:1 ($LiNi_xCo_yMn_zO_2$, x:y:z=1:1:1) cathode, and with graphite anodes, however one cell used a conventional binder composition (CMC/SBR), and the other cell included the CMC/SBR/Mg-Alginate binder according to an embodiment. The normalized capacity retention shows that the battery cell with the conventional binder degrades surprisingly faster than the cell including the Mg-Alginate binder according to an embodiment. Specifically, at cycle number of 60, the capacity retention of the battery with CMC/SBR/Mg-Alginate battery (70.1% of initial capacity) is 7.7% higher than the cell including the conventional binder (65.1% of initial capacity). Thus, according to at least one embodiment, the inclusion of the Mg-Alginate in the binder unexpectedly aids in retaining battery capacity over the life of the cell.

Figure 3:
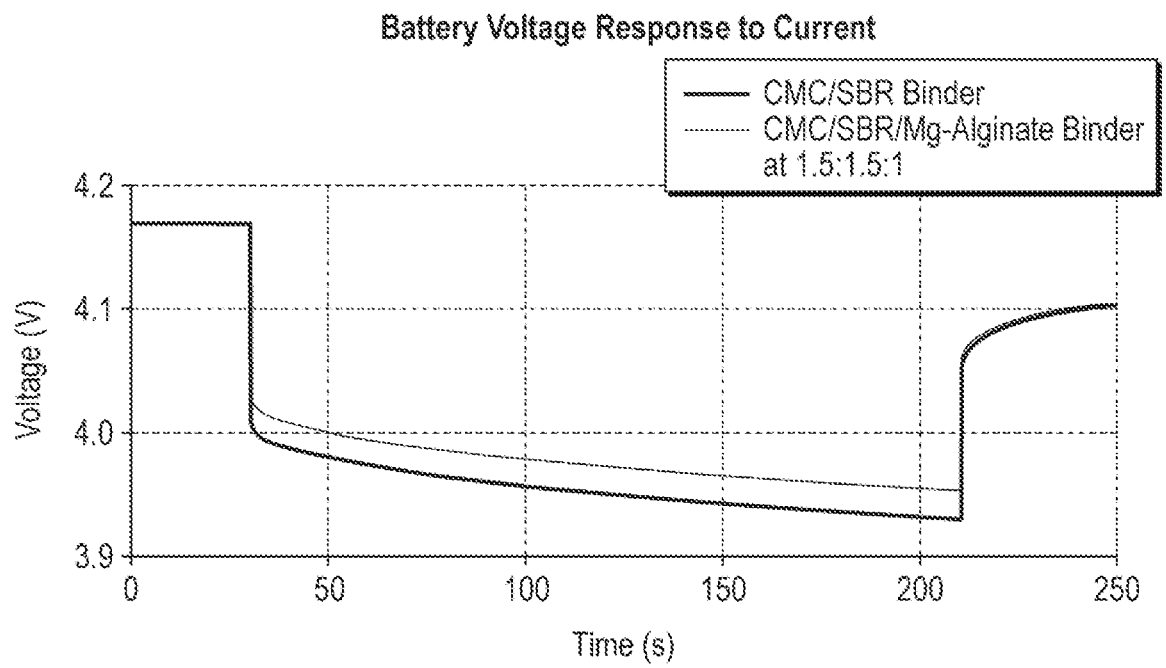
FIG. 3 is a graph comparing the battery voltage response over time of a cell having a conventional CMC/SBR binder, and the battery voltage response over time of a cell having a CMC/SBR/Mg-Alginate binder according to an embodiment.

In addition to improvements in specific capacity and cycle performance, battery performance can be measured by the power capability. Power capability can be compared by applying 1 C of current for 3 minutes to a battery prepared with a conventional CMC/SBR binder and a cell prepared with the CMC/SBR/Mg-Alginate binder according to an embodiment. The voltage response of each cell is plotted in FIG. 3. Before the current pulse, both batteries have the same open circuit voltage. However, during the current pulse, the battery with anode binder according to an embodiment shows an unexpected smaller change in voltage change than the battery with the conventional anode binder. Further, according to Ohm's law, the internal resistance of battery with conventional CMC/SBR binder is 80 mΩ, while the resistance of battery with the CMC/SBR/Mg-Alginate binder is 71.6 mΩ. Thus, the binder unexpectedly reduces the battery internal resistance by 10.5%. The reduction in internal resistance is advantageous as it improves power capability, and can result in lower operating temperatures due to less internal heat generation.

Figure 4:
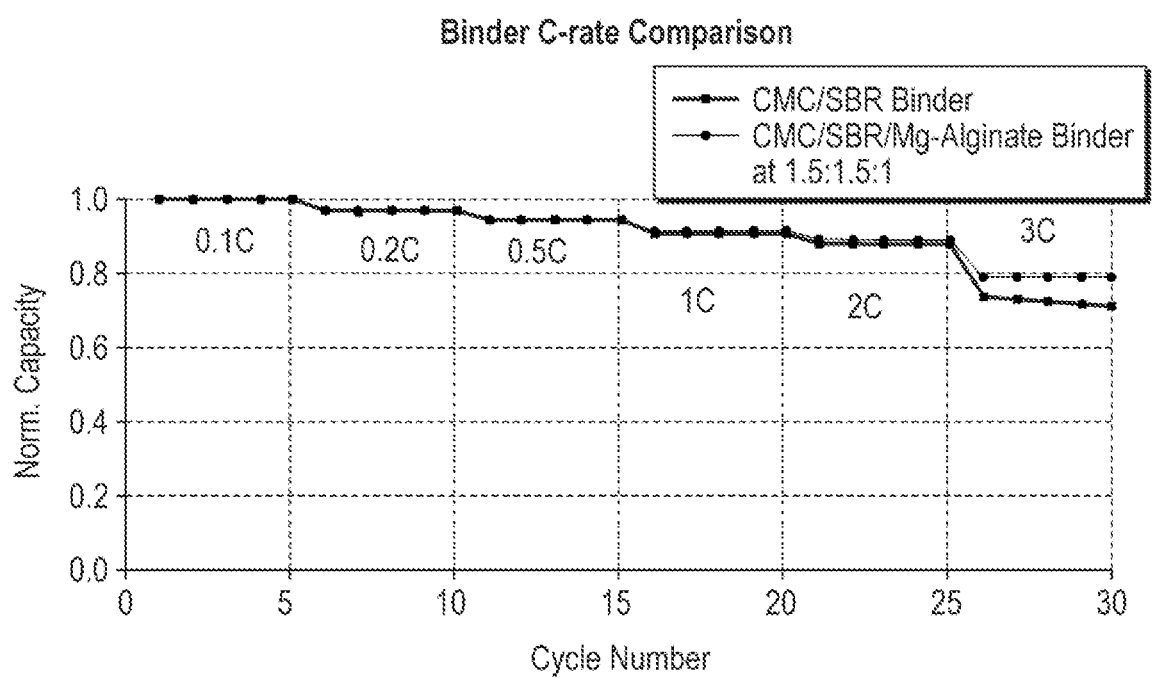
FIG. 4 is a graph comparing the capacity over cycles at various charge rates of a cell having a conventional CMC/SBR binder and a cell having a CMC/SBR/Mg-Alginate binder according to an embodiment.

Referring to FIG. 4, cell capacity is shown during at various C rates for a cell with a conventional CMC/SBR binder and for a cell prepared with the CMC/SBR/Mg-Alginate binder according to an embodiment. For the last 5 cycles, 3C rate current is applied to the cell. Although over cycles at low charging rates the anode binders perform similarly, at a fast charge/discharge of 3 C, over more cycles (i.e., 25 cycles for this embodiment), the cell with the CMC/SBR/Mg-Alginate binder has a higher normalized capacity than the cell with the conventional CMC/SBR binder. For example, for charging, the charging cut off voltage is 4.2V. When this voltage is reached, the charging process is stopped. From FIG. 4, it can be determined that at the 30th cycle, the cell with Mg-Alginate binder reached 79.1% state-of-charge (SOC), while the cell with conventional binder only reached 70.8% SOC. This reflects the lower internal resistance of the cell including the Mg-Alginate binder and a smaller polarization at high current, thus providing fast charge capabilities.

The fast charge benefits of the CMC/SBR/Mg-Alginate binder can further be exemplified by the robustness of the cell and shorter fast charge time determined from FIG. 4. During the last 5 cycles with 3C rates, the normalized capacity of the cell with the Mg-Alginate binder does not change significantly obviously, while the normalized capacity of the conventional cell decreases from 0.739 to 0.708 (a 4.2% capacity degradation), indicating that the cell with the Mg-Alginate binder is more robust during high current charging processes. Furthermore, for fast charge, 80% SOC is commonly used in industry as the target of fast charge. The cell with the Mg-Alginate binder at 80% SOC, a 3C charge is almost complete with the time cost being 16 minutes. For the conventional cell, the 3C charges only to 70% SOC, and then the conventional cell requires a lower charge current to get to 80% SOC. With a second charging step at 2C, the total charging time is 17 minutes, 6.3% longer than the cell with Mg-Alginate. As such, the cell with the CMC/SBR/Mg-Alginate binder improves fast-charge capabilities of the cell.

According to at least one embodiment, a lithium ion battery includes an anode having an active material, a conductive additive, and a binder having a 1.5:1.5:1 ratio of CMC/SBR/Mg-Alginate. The lithium ion battery having this anode binder included at the 1.5:1.5:1 ratio has an unexpected improvement in cell conductivity and fast charge performance when compared with conventional cells without Mg-Alginate. Specifically, the anode binder according to one or more embodiments shows improvement in anode specific capacity (5.1%), battery cycle performance (7.7%), and battery power capability (10.5%) over conventional binders without Mg-Alginate, thus improving overall cell performance when compared to anodes including conventional binders.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium ion battery comprising:
   an anode including an active material, a conductive additive, and a binder including carboxymethyl cellulose, styrene-butadiene rubber, and magnesium-alginate at a ratio of 1.5:1.5:1 such that a specific capacity of the anode is 350 mAh/g to 365 mAh/g and an internal resistance of the anode is 65 mΩ to 75 mΩ;
   a cathode; and
   a separator between the anode and cathode.

2. The lithium ion battery of claim 1, wherein the conductive additive is graphite.

3. The lithium ion battery of claim 1, wherein the anode comprises 92.5% to 97.5% active material.

4. The lithium ion battery of claim 1, wherein the anode comprises 95.5% active material, 1.5% carboxymethyl cellulose, 1.5% styrene-butadiene rubber, 1% magnesium-alginate, and 0.5% graphite.

5. The lithium ion battery of claim 1, wherein the specific capacity is 355 mAh/g to 360 mAh/g.

6. The lithium ion battery of claim 5, wherein the specific capacity is 357.5 mAh/g.

7. The lithium ion battery of claim 1, wherein the internal resistance is 67.5 mΩ to 72.5 mΩ.

8. The lithium ion battery of claim 7, wherein the internal resistance is 71.6 mΩ.

9. A lithium ion battery comprising:
   a cathode;
   an anode including an active material, a conductive additive, and a binder, the binder including carboxymethyl cellulose, styrene-butadiene rubber, and magnesium-alginate at a ratio of 1.5:1.5:1 such that a specific capacity of the anode is 350 mAh/g to 365 mAh/g; and
   a separator therebetween.

10. The lithium ion battery of claim 9, wherein the conductive additive is graphite.

11. The lithium ion battery of claim 9, wherein the specific capacity is 355 mAh/g to 360 mAh/g.

12. The lithium ion battery of claim 11, wherein the specific capacity is 357.5 mAh/g.

13. The lithium ion battery of claim 9, wherein the anode has an internal resistance of 65 mΩ to 75 mΩ.

14. The lithium ion battery of claim 13, wherein the internal resistance is 67.5 mΩ to 72.5 mΩ.

15. The lithium ion battery of claim 14, wherein the internal resistance is 71.6 mΩ.

16. The lithium ion battery of claim 9, wherein the anode comprises 92.5% to 97.5% active material.

17. The lithium ion battery of claim 9, wherein the anode comprises 95.5% active material, 1.5% carboxymethyl cellulose, 1.5% styrene-butadiene rubber, 1% magnesium-alginate, and 0.5% graphite.

18. A lithium ion battery comprising:
   an anode including 95.5% active material, 1.5% carboxymethyl cellulose, 1.5% styrene-butadiene rubber, 1% magnesium-alginate, and 0.5% graphite;
   a cathode; and
   a separator therebetween;
   wherein the anode has a specific capacity of 350 mAh/g to 365 mAg/g.

19. The lithium ion battery of claim 18, wherein the anode has an internal resistance of 65 mΩ to 75 mΩ.

* * * * *